(12) United States Patent
Skinner et al.

(10) Patent No.: US 11,976,552 B2
(45) Date of Patent: May 7, 2024

(54) DISTRIBUTED SENSING SYSTEMS AND METHODS WITH SPATIAL LOCATION CORRELATION

(71) Applicant: HALLIBURTON ENERGY SERVICES, INC., Houston, TX (US)

(72) Inventors: Neal G. Skinner, Lewisville, TX (US); Andreas Ellmauthaler, Rio de Janeiro (BR); David Andrew Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 62 days.

(21) Appl. No.: 16/325,745

(22) PCT Filed: Oct. 5, 2016

(86) PCT No.: PCT/US2016/055441
§ 371 (c)(1),
(2) Date: Feb. 15, 2019

(87) PCT Pub. No.: WO2018/067135
PCT Pub. Date: Apr. 12, 2018

(65) Prior Publication Data
US 2019/0211671 A1    Jul. 11, 2019

(51) Int. Cl.
*G01D 5/353* (2006.01)
*E21B 47/135* (2012.01)
(Continued)

(52) U.S. Cl.
CPC ....... *E21B 47/135* (2020.05); *G01D 5/35354* (2013.01); *G01H 9/004* (2013.01); *G01V 1/226* (2013.01); *G01V 2210/1429* (2013.01)

(58) Field of Classification Search
CPC .. E21B 47/135; G01H 9/004; G01D 5/35354; G01V 1/226; G01V 2210/1429
See application file for complete search history.

(56) References Cited

U.S. PATENT DOCUMENTS 5,825,804 A * 10/1998 Sai ................... G01K 11/32
                                                                    374/137
8,537,345 B2   9/2013 Crickmore et al.
(Continued)

FOREIGN PATENT DOCUMENTS

WO    2015163899 A1    10/2015
WO    2016060678 A1    4/2016

OTHER PUBLICATIONS

International Search Report and Written Opinion dated Sep. 25, 2017 for international patent application No. PCT/US2016/055441, filed on Oct. 5, 2016.

*Primary Examiner* — Xin Y Zhong
(74) *Attorney, Agent, or Firm* — K&L Gates LLP (57) ABSTRACT

Distributed sensing systems and methods with spatial location correlation of a reflection produced along an electromagnetic (EM) waveguide. A distributed sensing system comprises an EM waveguide, a distributed sensing interrogator, and a processor. The distributed sensing interrogator comprises a transmitter coupled to the EM waveguide and generates an interrogation pulse through the EM waveguide. The distributed sensing interrogator also comprises a receiver coupled to the EM waveguide and responsive to backscattered EM waves propagating through the EM waveguide. The processor determines a spatial location associated with a reflection produced along the EM waveguide using a return signal generated from the reflection by the interrogator and an interrogation signal including the interrogation pulse.

21 Claims, 9 Drawing Sheets

(51) Int. Cl.
*G01H 9/00* (2006.01)
*G01V 1/22* (2006.01)

(56) References Cited

U.S. PATENT DOCUMENTS

| | | |
|---|---|---|
| 8,848,485 B2 | 9/2014 | Bostick, III |
| 8,854,609 B2 | 10/2014 | Ahadian et al. |
| 8,913,887 B2 | 12/2014 | Hirth et al. |
| 9,036,991 B2 | 5/2015 | Aguren |
| 9,080,949 B2 | 7/2015 | Mestayer et al. |
| 9,103,746 B2 | 8/2015 | Kaufhold et al. |
| 9,109,944 B2 | 8/2015 | Den Boer et al. |
| 2008/0277568 A1* | 11/2008 | Crickmore ............... G08G 1/02 250/227.12 |
| 2011/0272147 A1 | 11/2011 | Beasley et al. |
| 2012/0016587 A1* | 1/2012 | Sierra .................... G01K 11/32 702/6 |
| 2014/0097848 A1* | 4/2014 | LeBlanc ................. E21B 47/06 324/338 |
| 2015/0116124 A1* | 4/2015 | Jaaskelainen ......... E21B 47/135 340/854.9 |
| 2015/0233767 A1 | 8/2015 | Cedilnik et al. |
| 2019/0211671 A1* | 7/2019 | Skinner ................. E21B 47/135 |

* cited by examiner

DISTRIBUTED SENSING SYSTEMS AND METHODS WITH SPATIAL LOCATION CORRELATION

This section is intended to provide relevant contextual information to facilitate a better understanding of the various aspects of the described embodiments. Accordingly, it should be understood that these statements are to be read in this light and not as admissions of prior art.

Distributed optical sensing technology is used for a number of downhole applications ranging from telemetry to passive seismic monitoring (e.g., distributed acoustic sensing). Distributed optical sensors are increasingly being used as devices for sensing mechanical strain, but sometimes also displacements, vibrations, pressure, acceleration, rotations, or concentrations of chemical species. The general principle of such devices is based on interferometry. A pulse of light from a laser is sent through an optical fiber and reflects back to a detector due to Rayleigh scattering. Subtle changes in the reflection, such as phase, can be caused by compressional or tensional forces applied to the optical fiber, which can indicate seismic features downhole. However, improvements are needed in correlating a spatial location in a borehole to a feature detected on the optical fiber through distributed optical sensing.

An optical time-domain reflectometry (OTDR) can be used to find the spatial location associated with reflections produced along an optical fiber, such as reflections produced from optical couplers attached to the optical fiber, bends in the optical fiber, and/or the like. In an OTDR system, a laser emits a light beam into a pulse generator that transmits an interrogation pulse into the optical fiber directed by a circulator. Rayleigh backscatter returns to the circulator, which directs the backscatter to a receiver. Optical loss measurements from the backscatter received by the receiver are made by plotting the returned optical power as a function of time. With the group velocity of light for the optical fiber, the power-time plot of the backscatter can be converted to a power versus distance plot to identify the spatial location of the Rayleigh scattering on the optical fiber. Many hundreds or thousands of interrogation pulses may be transmitted and the backscatter averaged to improve the signal-to-noise ratio of the time dependent optical power signal received by the receiver.

However, it is difficult to reliably correlate OTDR spatial measurements with distributed sensing channels, which represent a spatial location on the optical fiber. Some reasons for the difficulties in correlating distributed sensing channels with OTDR spatial locations include: differences in source wavelengths, differences in pulse width, differences in fiber properties (such as group velocities) applied to the two instruments, and differences in the way the two instruments are constructed and connected to the optical fiber. This disclosure can aid in correlating a spatial location to distributed sensing channels without the need or difficulties in employing an OTDR system.

DESCRIPTION OF THE DRAWINGS

For a detailed description of the embodiments, reference will now be made to the accompanying drawings in which:

FIGS. 1A and B show schematic views of a distributed sensing system deployed downhole as permanent installation, according to one or more embodiments;

DETAILED DESCRIPTION

This disclosure provides a distributed sensing system. Specifically, the disclosure provides a system, method, and interrogator for determining a spatial location associated with a reflection produced along an electromagnetic waveguide.

Figures 1A, 1B:
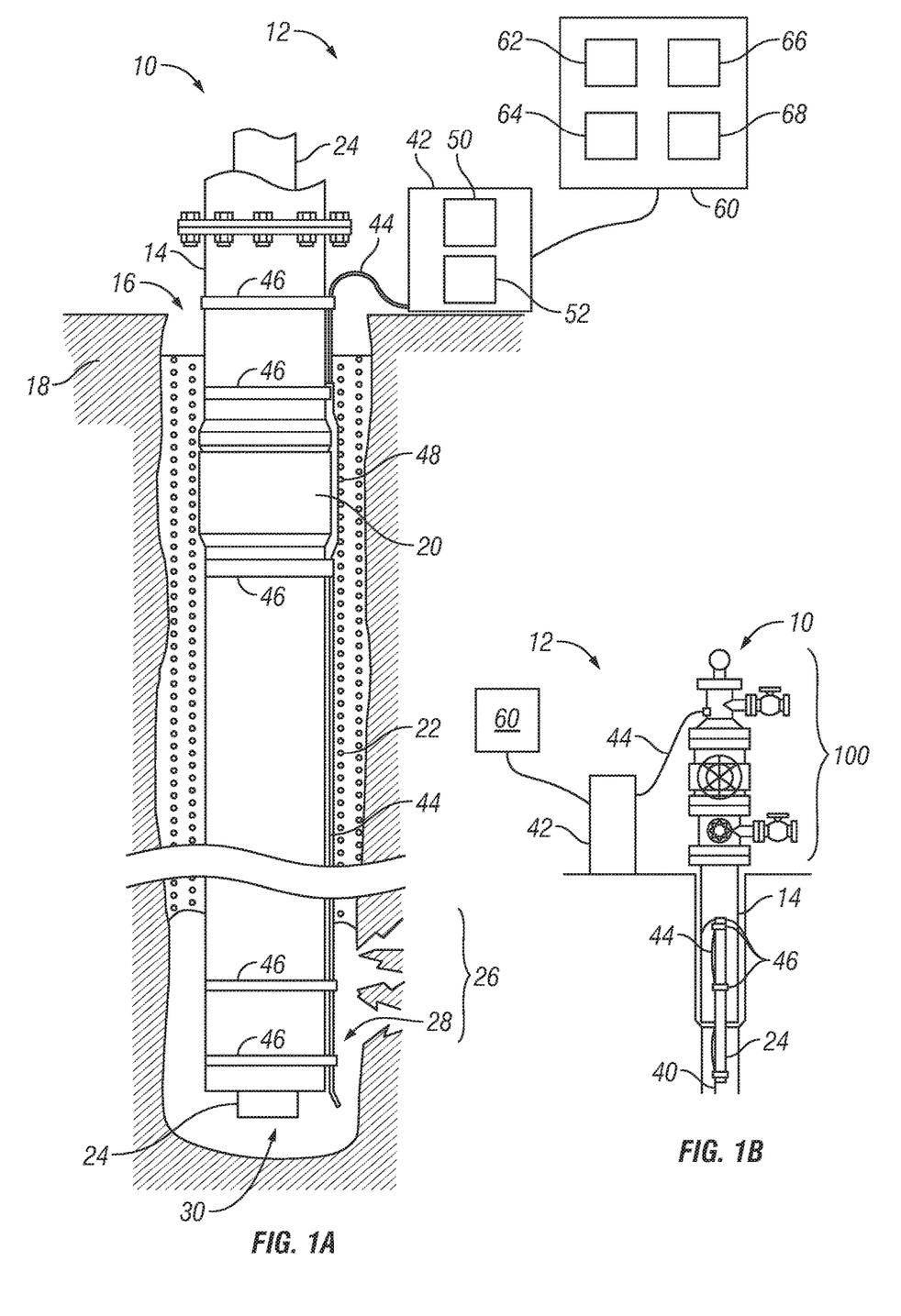

FIG. 1A shows a schematic view of a well 10 equipped with a distributed sensing system 12, in accordance with one or more embodiments. As shown, the well 10 is constructed and completed and includes a casing string 14 positioned in a borehole 16 that has been formed in a subterranean earth formation 18. The casing string 14 includes multiple tubular casing sections (usually about 30 feet (9 meters) in length) connected end-to-end by couplings 20. Within the well 10, cement 22 is injected between an outer surface of the casing string 14 and an inner surface of the borehole 16 and allowed to set. A production tubing string 24 is positioned in an inner bore of the casing string 14.

Figure 2:
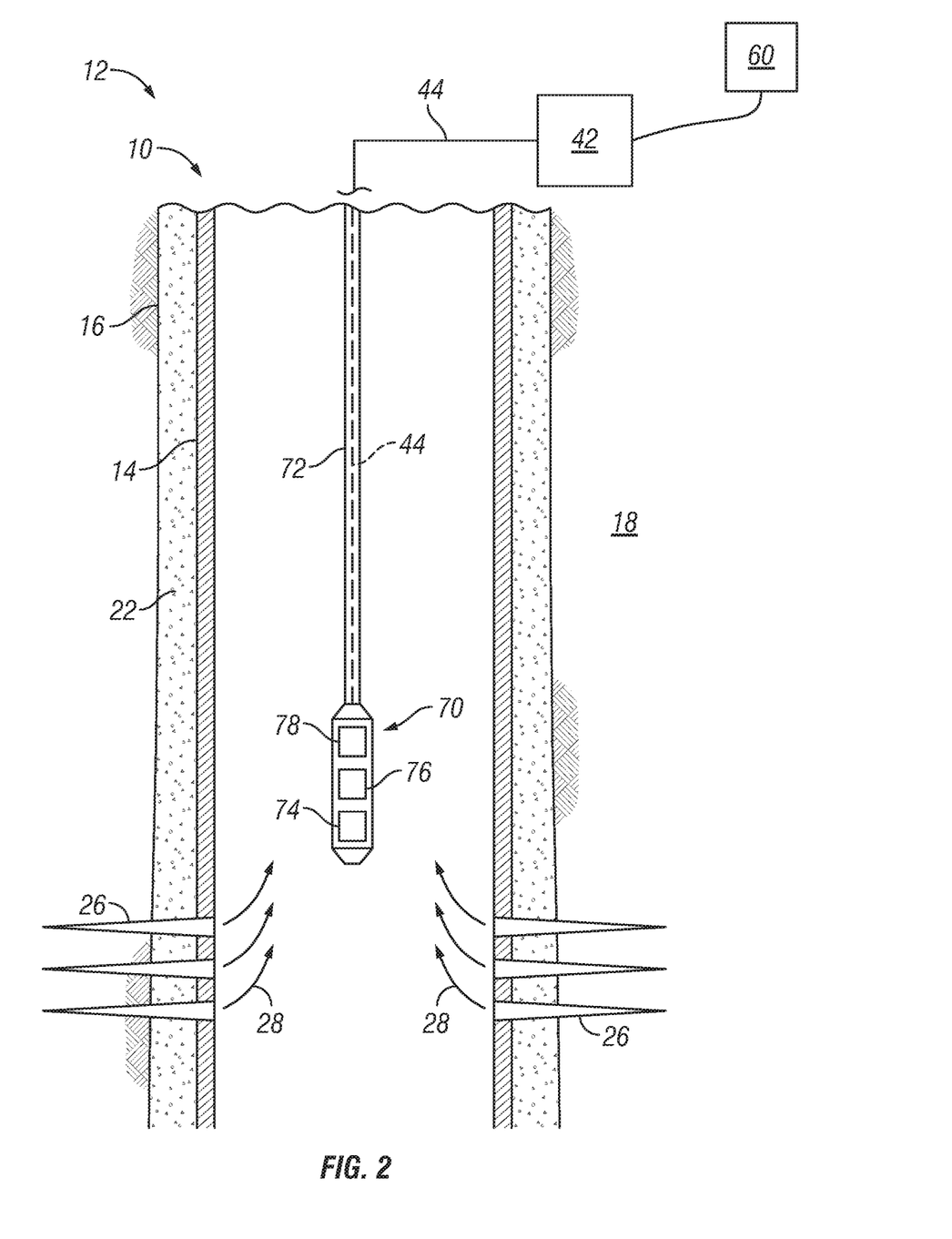
FIG. 2 shows a schematic view of a distributed sensing system retrievably deployed downhole, according to one or more embodiments.

The well 10 is configured to guide a desired fluid (e.g., oil, gas, or water) from a bottom of the borehole 16 to a surface of the earth 18. Perforations 26 have been formed at a subterranean location of the borehole 16 to facilitate the flow of a fluid 28 from a surrounding formation into the borehole 16 and to the surface via an opening 30 at the bottom of the production tubing string 24. The configuration of the well 10 as depicted in FIG. 2 is illustrative and not limiting on the scope of the disclosure.

The distributed sensing system 12 includes an interrogator 42 coupled to an electromagnetic (EM) waveguide 44 (e.g., a fiber optic cable) locatable in the well 10. The waveguide 44 extends along an outer surface of the casing string 14 and is held against the outer surface of the casing string 14 at spaced apart locations by one or more bands 46 that extend around the casing string 14. Optionally, a protective covering 48 is installed over the waveguide 44 at the coupling 20 of the casing string 14 and is held in place by two of the bands 46 installed on either side of coupling 20. The protective covering 48 may be installed over the waveguide 44 at each of the couplings 20 to prevent the waveguide 44 from being pinched or sheared between the coupling 20 and the borehole 16. It should be appreciated that, in downhole applications, the waveguide 44 can be connected to the production tubing string 24, coiled tubing, a fiber optic slickline, etc. The waveguide 44 can be deployed on the surface to generate distributed sensing measurements and is not limited to downhole applications.

The waveguide 44 terminates at the interrogator 42 with a port adapted for coupling the waveguide 44 to a transmitter 50 and a receiver 52. The transmitter 50 transmits EM pulses along the waveguide 44, which has scattering impurities. As an EM pulse propagates along the waveguide 44, reflections of the pulse scatter back along the waveguide 44 to the interrogator 42. The receiver 52 is responsive to the backscattered reflections, and as will be explained in greater detail below, the receiver 52 produces measurements of differences in phase of the backscattered reflections at channels on the waveguide 44.

The distributed sensing system 12 further includes a computer 60 in communication with the interrogator 42 to control the transmitter 50 and receiver 52. The computer 60 includes a processor 62, an output device 64 (e.g., a monitor, screen, printer, etc.), an input device 66 (e.g., a keyboard, touchpad, mouse, etc.), and a non-transitory machine-readable storage media 68 (e.g., ROM, EPROM, EEPROM, flash memory, RAM, a hard drive, a solid state disk, an optical disk, or a combination thereof). However, the computer 60 may be implemented in different forms including, but not limited to, an embedded processor installed as part of the interrogator 42, a portable computer that communicates with the interrogator 42 as desired to collect data, and a remote desktop computer in communication with the interrogator 42 via a wireless link and/or a wired computer network. The computer 60 is adapted to receive the measurement signals produced by the interrogator 42 and to responsively determine a distributed parameter such as, e.g., distributed acoustic parameters along the length of the waveguide 44. As used herein, the term processor is intended to include devices such as a field programmable gate array (FPGA).

For example, the non-transitory storage media 68 may store a software program for execution by the processor 62. The instructions of the software program may cause the computer 60 to collect phase differences of back-scattered reflections derived from the interrogator 42 and, based at least in part thereon, to determine downhole parameters such as acoustic signals along the length of the waveguide 44. The instructions of the software program may also cause the computer 60 to display the acoustic waveforms or envelopes associated with each point on the waveguide 44 via the output device 64.

The distributed sensing system 12 illustrated is suitable for monitoring production in a well, but is also suitable for monitoring treatment operations, cementing operations, active and passive seismic surveys, field activity monitoring, and the like.

FIG. 1B shows schematic view of an alternative embodiment of the distributed sensing system 12 having the waveguide 44 strapped to the outside of the production tubing 24 rather than the outside of the casing 14. Rather than exiting the well 10 from the annular space outside the casing, the waveguide 44 exits through an appropriate port in the "Christmas tree" 100, i.e., the assembly of pipes, valves, spools, and fittings connected to the top of the well to direct and control the flow of fluids to and from the well. The waveguide 44 extends along the outer surface of the production tubing string 24 and is held against the outer surface of the production tubing string 24 at spaced apart locations by multiple bands 46 that extend around the production tubing string 24. The distributed sensing system 12 of FIG. 1B optionally includes a hanging tail 40 at the bottom of a borehole. The waveguide 44 may also be suspended inside the production tubing 24 or the borehole 16 and held in place by a suspended weight on the end of the waveguide.

For example, FIG. 2 shows a schematic view of the distributed sensing system 12 of FIGS. 1A and B retrievably deployed downhole via a conveyance string 72, in accordance with one or more embodiments. Rather than a permanent installation for the distributed sensing system 12 depicted in FIGS. 1A and B, the waveguide 44 is retrievably suspended in the borehole 16 by the conveyance string 72. A well logging assembly 70 may also be attached to the conveyance string 72 and conveyed in the borehole 16. The well logging assembly 12 may include one or more logging tools, including but not limited to, a casing collar locator 74, a gamma ray tool 76, and sensors 78 (for example, a pressure sensor and a temperature sensor). However, it should be appreciated that instead of using the well logging assembly 70, a weight may be attached to lower the conveyance string 72 into the borehole 16. The conveyance string 72 and the waveguide 44 may also be suspended in the production tubing 24 of FIGS. 1A and B.

The conveyance string 72 may be in the form of a cable with suitable strength, temperature resistance, corrosion resistance, and protection for the waveguide 44. The cable may comprise stranded cable or cable made from metal tubing or control line, with the waveguide 44 inside the line. The conveyance string 72 may be in the form of a coiled tubing string (e.g., a substantially continuous tubular string, stored on a reel or drum), with the waveguide 44 positioned inside, in a wall of, and/or exterior to, the coiled tubing. The scope of this disclosure is not limited to any particular form of the conveyance string 72, or to any particular position of the waveguide 44 with respect to the conveyance string 72.

Figure 3A:
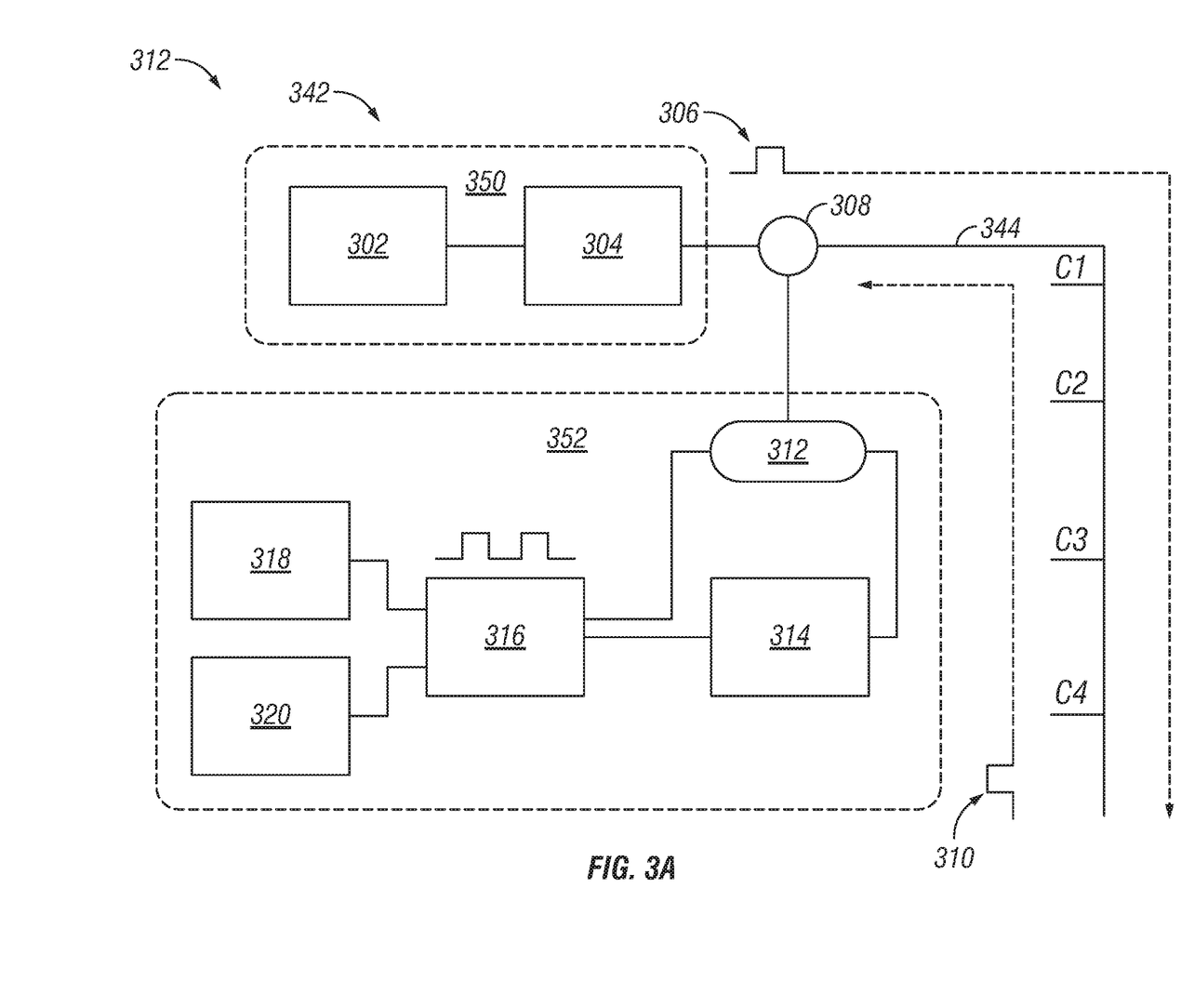
FIGS. 3A and B show schematic views of distributed sensing systems, according to one or more embodiments.
Figure 3B:
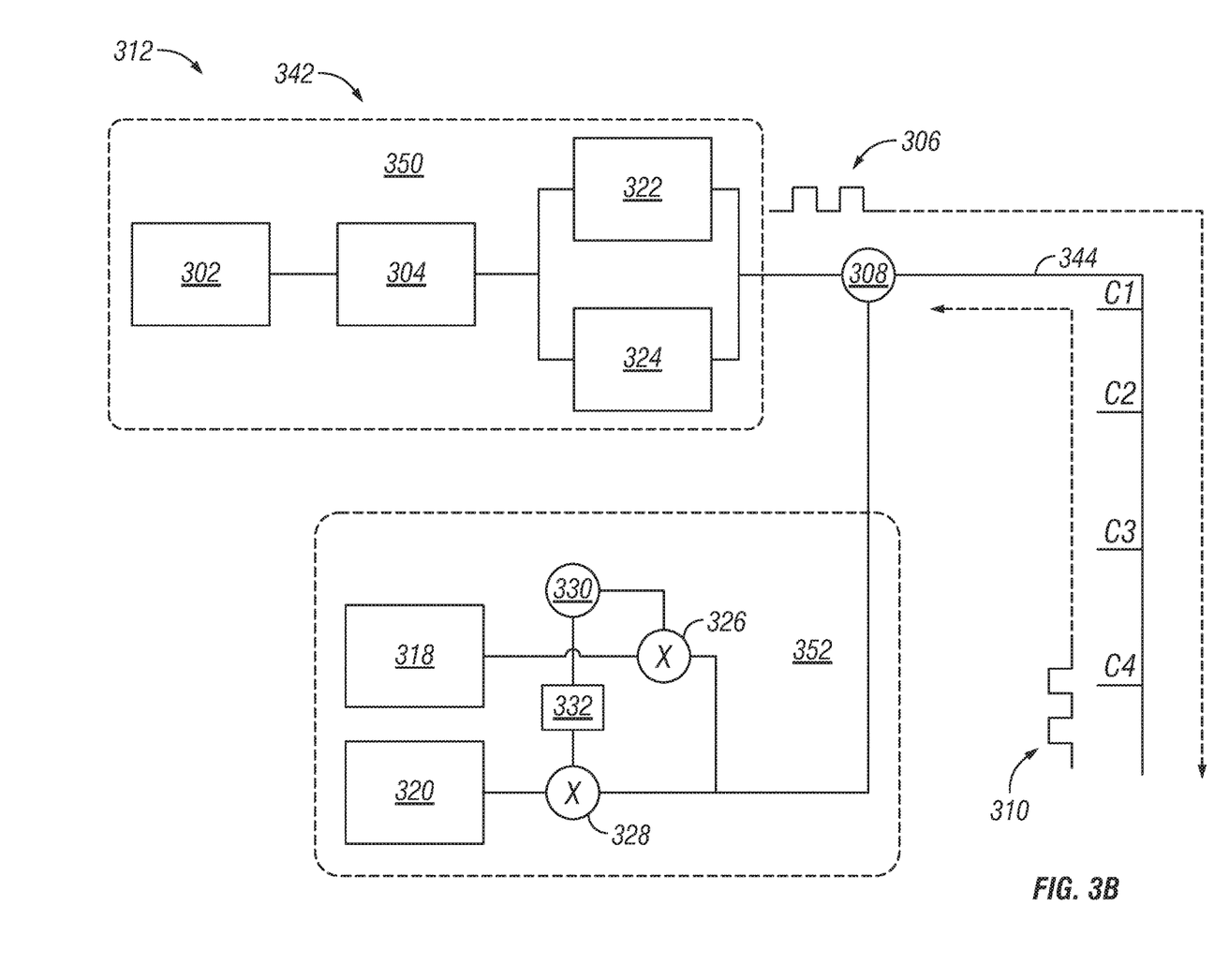

FIGS. 3A and 3B show schematic views of a distributed sensing system 312 that employs an interrogator 342 to detect parameters (e.g., an acoustic response) along an EM waveguide 344, according to one or more embodiments. As shown in FIG. 3A, the distributed sensing system 312 employs a homodyne detection scheme. The transmitter 350 includes an energy source 302 and a pulse generator 304. The energy source 302 can include any suitable energy source that emits an EM wave with a high coherence, such as a high coherence (ultra monochromatic) single transverse mode (TEM00) laser. A gas laser (e.g., HeNe) may be preferred, though an erbium doped fiber laser or a vertical cavity emitting laser (VCSEL) may be acceptable alternatives. The pulse generator 304 turns the EM wave into interrogation pulses 306 with an adjustable pulse width and adjustable spacing between pulses 306. An illustrative pulse width of 1 nanosecond can offer a spatial resolution of about 1 meter along the EM waveguide 344, and an illustrative pulse spacing of about 0.1 milliseconds can offer a sampling rate of about 10 kHz on the EM waveguide 344 with a length of about 10 kilometers. Thus, the spatial resolution depends in part on the pulse width, and the sampling frequency of the interrogator 342 depends on the length of the EM waveguide 344. These parameters can be tailored to the particular details of each installation.

A circulator 308 directs the interrogation pulses 306 to the EM waveguide 344 which can be run along a borehole (e.g., the borehole 16 of FIG. 1A) on the casing string, production string, coiled tubing, slickline, etc. The interrogation pulse 306 suffers from Rayleigh scattering such that a backscattered signal 310 propagating along the EM waveguide 344 returns to the receiver 352, which is responsive to backscattered EM waves propagating through the EM waveguide 344. The backscatter signal 310 includes reflections produced from Rayleigh scattering along the EM waveguide 344. Within the receiver 352, the backscattered signal 310 can be split by a coupler 312, which feeds the backscattered signal 310 into a delay device 314 and a mixer 316. The delay device 314 delays the backscattered signal 310 by an amount of time (e.g., 50 nanoseconds) so that reflections from different spatial locations on the EM waveguide 344 can be analyzed once combined by the mixer 316. The delay device 314 can include an EM waveguide delay coil, an optical delay coil, a Faraday rotator mirror coupled to an EM waveguide delay coil, any suitable device configured to delay an EM wave, or a combination thereof.

The mixer 316 combines the delayed backscattered signal received from the delay device 314 and the backscattered signal 310 received from the coupler 312 into a return signal 318, which is a combination of reflections scattered from different spatial locations along the EM waveguide 344. The return signal 318 comprises a superposition of the backscattered reflections 310 and the delayed backscattered reflections 310. The mixer 316 can include an analog-to-digital converter (ADC) to sample the return signal 318 for further processing. The mixer 316 produces a quadrature signal 320 that modulates the output signal 318 by a 90 degree phase shift. The return signal 318 and quadrature signal 320 are associated with a channel (e.g., channels C1-C4) on the EM waveguide 344 based on the time it takes the backscattered signal 310 to return to the receiver 352. The combined reflections are tracked as a function of each interrogation pulse 306 transmitted to generate a time-dependent measurement of channel phase difference, from which a corresponding parameter can be determined, such as an acoustic response. As used herein, a channel refers to a spatial location along the EM waveguide 344 depending in part on the propagation velocity of EM waves traveling in the EM waveguide 344. It should be appreciated that the distributed sensing system 312 is not limited to the configuration depicted in FIG. 3, but may be based on a Mach-Zehnder interferometer, a Michelson interferometer, or any other suitable interferometer.

A computer (e.g., the computer 60 of FIG. 1A) collects samples of the output signal 318 and the quadrature signal 320 and processes the samples to determine and track the phase difference between the combined backscattered reflections 310 produced by the mixer 316. Abbreviating the output signal 318 as "I" and the quadrature signal 320 as "Q", the following relationship to the phase difference is given:

$$I=\cos(phase)$$

$$Q=\sin(phase)$$

$$phase=\arctan(Q/I)$$

The difference in phase between the delayed backscattered reflections and the backscattered reflection 310 changes as a portion of the EM waveguide 344 is stretched or compressed at corresponding locations on the EM waveguide 344, such as the channels C1-C4. As such, this phase difference is indicative of a parameter related to the tension or compression applied to the EM waveguide 344, such as an acoustic response. Knowing the spatial location of each channel C1-C4 is critical to gathering accurate, reliable data along the EM waveguide 344.

FIG. 3B shows the distributed sensing system 312 employing a heterodyne detection scheme, according to one or more embodiments. Each pulse generated by the pulse generator 304 is converted into two spaced interrogation pulses 306, using a dual path system with a delay device 324 in one path and a frequency modulator 322 (e.g., an acousto-optic modulator) in the other path. The modulator 310 provides a frequency shift, so that the two interrogation pulses 306 exiting the transmitter 350 are at different frequencies.

The backscattered light is a combination of light from the two interrogation pulses 306 scattered from different points on the EM waveguide 344. The frequency difference of the dual pulses creates a beat frequency in the combined backscatter. An oscillator 330 is tuned to demodulate this beat frequency to a baseband in-phase signal 318 and a quadrature-phase signal 320. Multipliers 326, 328 each take the product of the electrical beat frequency signal and the oscillator signal, with multiplier 328 employing a 90°-shift 332 on the oscillator signal to produce the quadrature signal 320.

Figure 4:
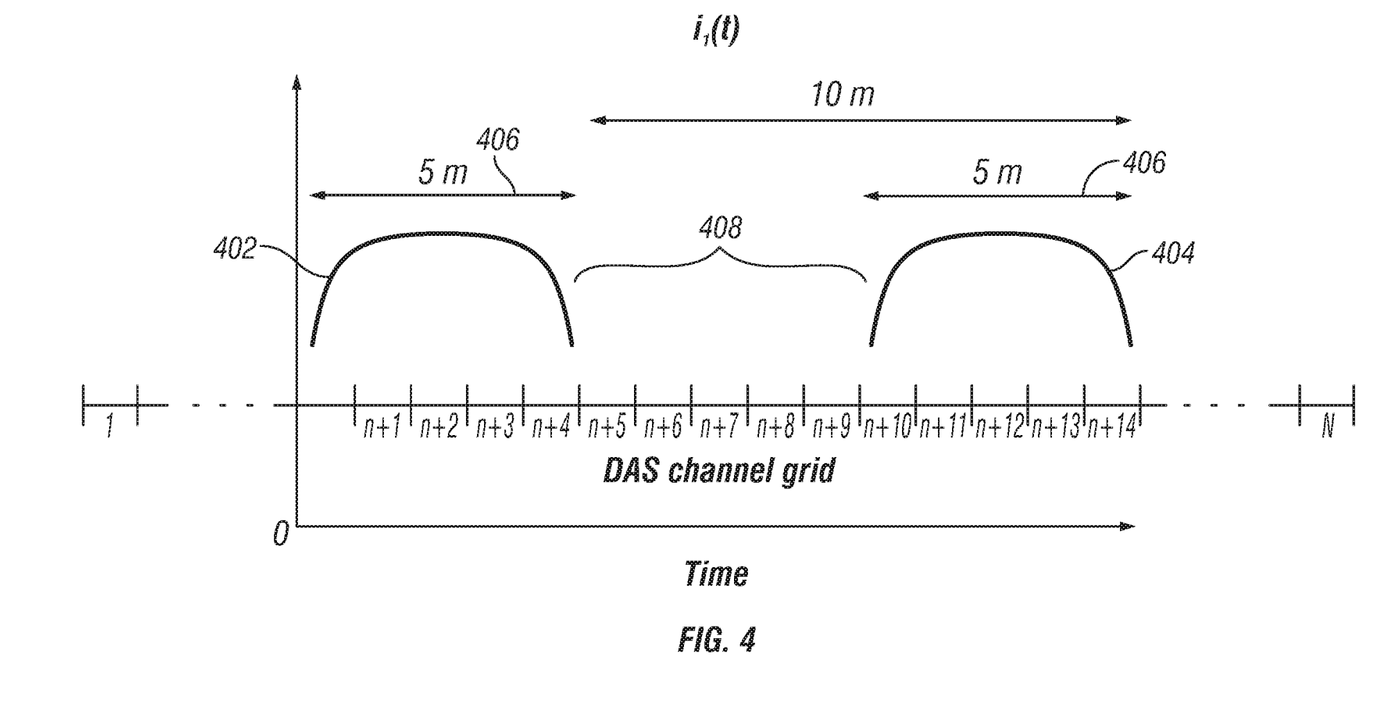
FIG. 4 shows a graph of an interrogation signal of a distributed sensing system, according to one or more embodiments.

FIG. 4 shows a graph view of an interrogation signal $i_1(t)$, in accordance with one or more embodiments. As shown, the interrogation signal $i_1(t)$ is the signal intensity as a function of time including two interrogation pulses 402, 404 that can be generated by a distributed sensing system. It should be appreciated that, in a homodyne or heterodyne detection scheme, the interrogation signal $i_1(t)$ input to the distributed sensing system 312 can be viewed not as a single interrogation pulse 306 but as two interrogation pulses 402, 404 transmitted through the EM waveguide 344. The pulses 402, 404 have identical shapes, and the pulse 404 is shifted in time by half the amount of delay introduced from the delay device (314 or 324). The interrogation signal $i_1(t)$ comprises a superposition of the interrogation pulse 306 and the delayed interrogation pulse 306. Thus, the interrogation signal $i_1(t)$ can be determined from the pulse width of the interrogation pulse 306 and the amount of delay introduced by the delay device 314. In one or more embodiments, the interrogation signal $i_1(t)$ can be recorded from the transmitter 350. Additionally, or alternatively, the interrogation signal $i_1(t)$ can be modeled based on the pulse width of the interrogation pulse 306 and the amount of delay introduced by the delay device 314

As illustrated, each pulse 402 and 404 may have a pulse width 406 of about 50 nanoseconds. The EM waveguide 344 may have a group velocity such that each pulse 402 and 404 has a spatial width of about 5 meters through the EM waveguide 344. The delay device 314 or 324 may have a gauge length of about 10 meters on a delay coil to provide a delay 408 of about 50 nanoseconds. The distributed sensing channels can offer a spatial resolution of about 1 meter on the EM waveguide 344 depending on the sampling frequency used to generate the return signal 318 and the quadrature signal 320.

When the pulses 402, 404 are transmitted through the EM waveguide 344, a Rayleigh scattering return signal $r_1(t)$ is generated by the interrogator 342. The return signal $r_1(t)$ comprises a superposition of the backscattered reflections 310 and the delayed backscattered reflections 310. The interrogation signal $i_1(t)$ and the return signal $r_1(t)$ can be converted to the frequency domain based on their Fourier transforms, $I_1(\omega)$ and $R_1(\omega)$ respectively. By applying linear systems theory, the return signal $R_1(\omega)$ in the frequency domain is given by:

$$R_1(\omega)=H(\omega)I_1(\omega) \quad (1)$$

where $H(\omega)$ is the frequency response with respect to the return signal $r_1(t)$ and the interrogation signal $i_1(t)$. In order to determine the frequency response $H(\omega)$ from the return signal $r_1(t)$ and the interrogation signal $i_1(t)$, the following operation can be applied in the frequency-domain (e.g., the Fourier domain):

$$H(\omega) = \frac{R_1(\omega)}{I_1(\omega)} \quad (2)$$

which corresponds to a deconvolution operation in the time-domain with the interrogation signal $i_1(t)$ and the return signal $r_1(t)$. By applying the inverse Fourier transform to the frequency response $H(\omega)$, a reflection signal $r_H(t)$ can be obtained that includes a pulse for each reflection produced along the EM waveguide 344. The reflection signal $r_H(t)$ can be used to determine the spatial location associated with a reflection produced along the EM waveguide 344 (e.g., a reflection produced from couplers or bends in the EM waveguide 344). The reflection signal $r_H(t)$ can be converted from a function of time to a function of distance $r_H(x)$ based on the group velocity of the EM waveguide 344 and/or correlated to corresponding distributed sensing channels C1-C4.

Figure 5:
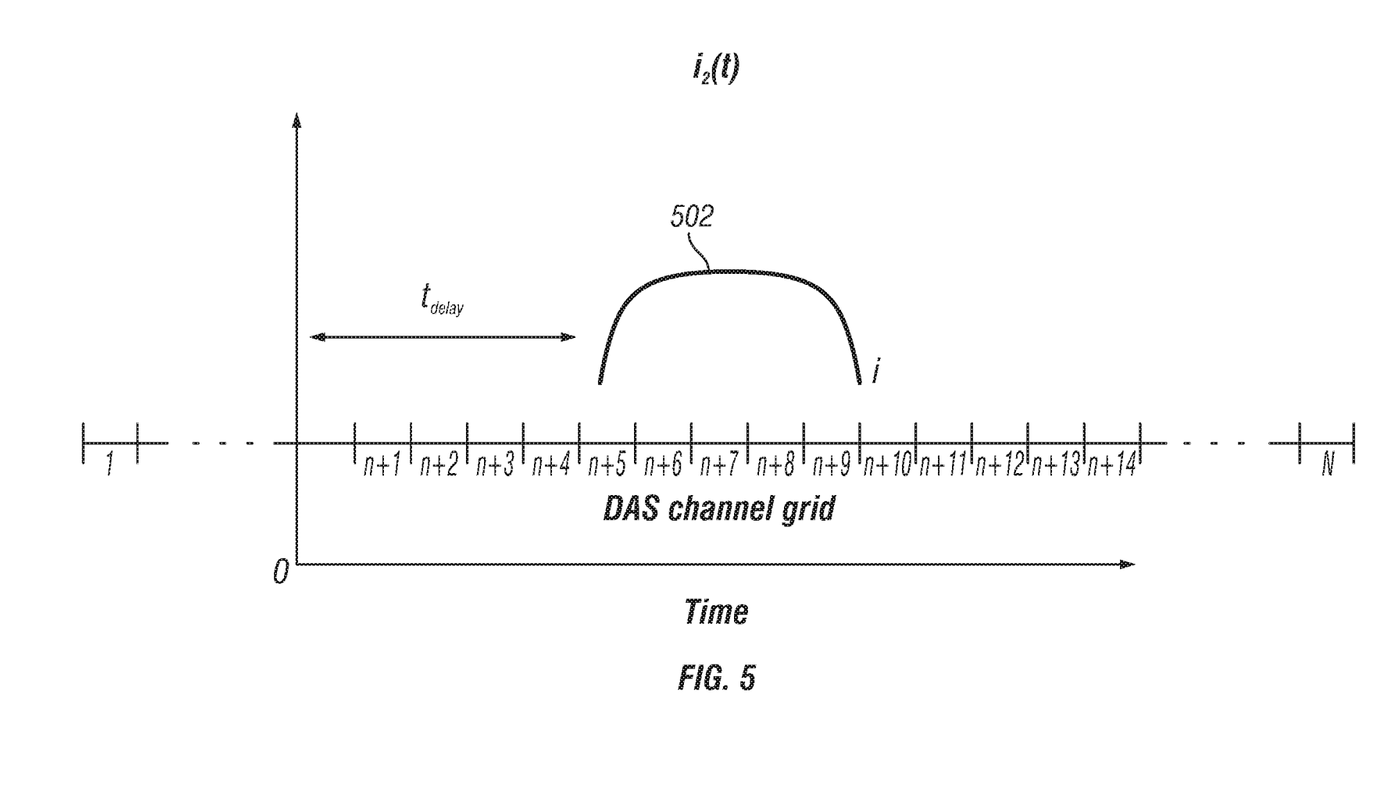
FIG. 5 shows a graph of an interrogation signal of an OTDR system, according to one or more embodiments.

FIG. 5 shows a graph of a second interrogation signal $i_2(t)$ that can be applied to the frequency response $H(\omega)$ to simulate the return signal obtained from an OTDR system, in accordance with one or more embodiments. The second interrogation signal $i_2(t)$ can include an interrogation pulse 502 that can be transmitted by an OTDR system (e.g., the interrogation pulse 106) to recover spatial locations associated with Rayleigh scattering along the EM waveguide 344. In one or more embodiments, the second interrogation signal $i_2(t)$ can include a modeled interrogation pulse and/or an interrogation pulse recorded from a pulse generator (e.g., the pulse generator of an OTDR system previously described herein). The interrogation pulse 502 can have a pulse width of about 10 nanoseconds to about 10 microseconds. Thus, OTDR measurements can be modeled to generate a reflection signal $r_2(t)$ by applying the second interrogation signal $i_2(t)$ to the frequency response $H(\omega)$ obtained in equation (2). The reflection signal $r_2(t)$ can include a modeled OTDR return signal based on the frequency response $H(\omega)$ of the distributed sensing system 312.

Since the return signal $r_1(t)$ represents the energy resulting from the convolution of a reflection with the dual-pulse structure 402 and 404, the second interrogation signal $i_2(t)$ can be modeled in between the pulses 402 and 404 (FIG. 4), such that rather than starting at time t=0 where the first pulse 402 started, a single pulse 502 is shifted at time $t_{delay}$ as shown in FIG. 5. The time shift $t_{delay}$ can be determined based on the pulse width 406 of the pulses 402 and 404 and/or the delay 408 introduced by the delay device 314 or 324. Thus, the spatial measurements of an OTDR system can be modeled by taking into account the interrogation signal $i_2(t)$ that would be transmitted through the EM waveguide 344 by an OTDR system.

The reflection signal $r_2(t)$ in the frequency domain is given by:

$$R_2(\omega) = H(\omega)I_2(\omega) = \frac{R_1(\omega)}{I_1(\omega)}I_2(\omega) \quad (3)$$

where $I_2(\omega)$ is the interrogation signal $i_2(t)$ transformed in the frequency domain (e.g., the Fourier transform of $i_2(t)$). $R_2(\omega)$ represents the modeled reflection signal in the frequency-domain generated by an OTDR system based on the frequency response of the distributed sensing system. By applying the inverse Fourier transform to the reflection signal $R_2(\omega)$, a plot of the reflection signal $r_2(t)$ versus time can be used to determine the spatial location associated with a reflection produced along the EM waveguide 344 (e.g., a reflection produced from couplers or bends in the EM waveguide 344). The reflection signal $r_2(t)$ can be converted from a function of time to a function of distance $r_2(x)$ based on the group velocity of the EM waveguide 344 and/or correlated to corresponding distributed sensing channels C1-C4.

FIGS. 6-10 show graphs of signals (601, 701, 801, 901, 1001) that can be used to determine a spatial location associated with a reflection using a distributed sensing system in accordance with one or more embodiments. As shown, the vertical axes represent the energy of the signal, and the horizontal axis represents a distance in meters. Although the signals 601, 701, 801, 901, 1001 are shown as a function of distance, it should be appreciated that these signals (601, 701, 801, 901, 1001) are also representative of functions of time (e.g., $i_1(t)$, $r_1(t)$, $r_H(t)$, $i_2(t)$, and $r_2(t)$, respectively) based on the group velocity of an EM waveguide employed in the distributed sensing system.

Figure 6:
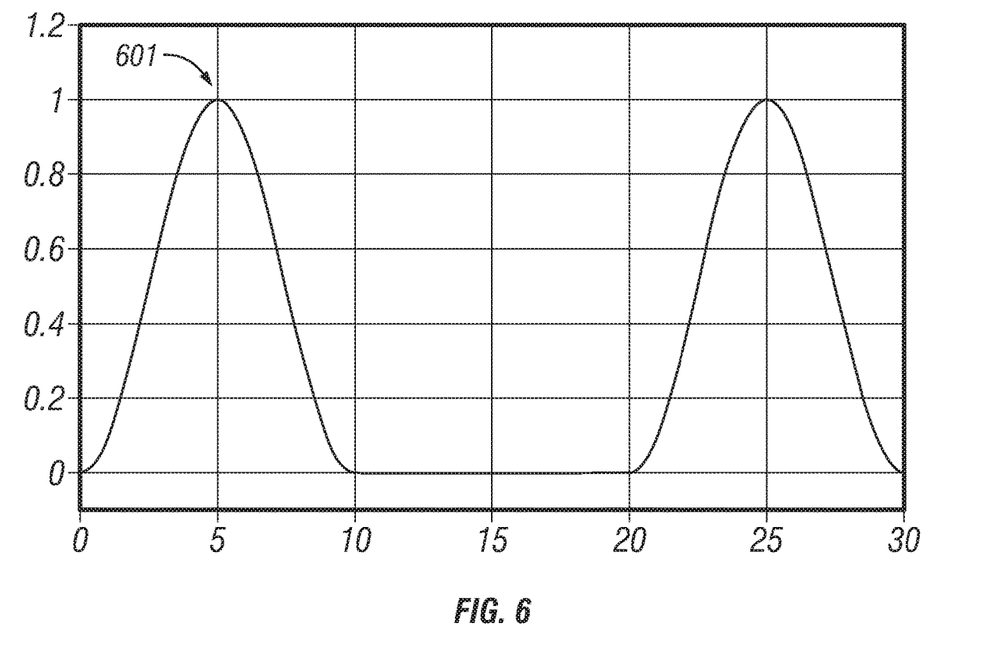
FIG. 6 shows a graph of an interrogation signal of a distributed sensing system, according to one or more embodiments.

In FIG. 6, an interrogation signal 601 generated by the distributed sensing system is shown. The interrogation signal 601 represents the two pulses (e.g., $i_1(t)$) that can be transmitted by an interrogator through the EM waveguide as a function of distance (m) with respect to signal energy. The interrogation signal 601 has a pulse width of about 100 nanoseconds and a delay between pulses of about 10 meters based on a delay coil with about 20 meters of delay.

Figure 7:
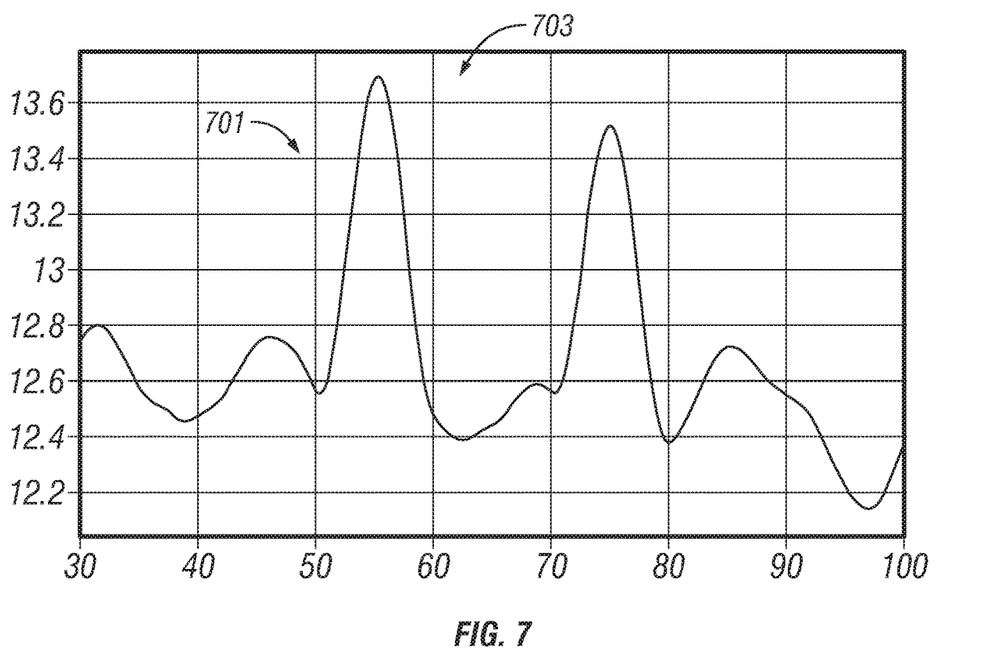
FIG. 7 shows a graph of a return signal generated by the distributed sensing system, according to one or more embodiments.

In FIG. 7, a return signal 701 (e.g., $r_1(t)$) is shown and represents the backscattered reflections received by the interrogator as a function of distance (m) with respect to signal energy. The return signal 701 shows reflections 703 between 50 and 80 meters produced along the EM waveguide. However, due to the interrogation signal 601 producing corresponding reflections, the precise spatial location of the reflections 703 along the EM waveguide is uncertain. It should be appreciated that the return signal 701 can be determined by convolving the frequency response of the distributed sensing system transformed in the time-domain ($r_H(t)$) with the interrogation signal 601 ($i_1(t)$) in the time domain.

Figure 8:
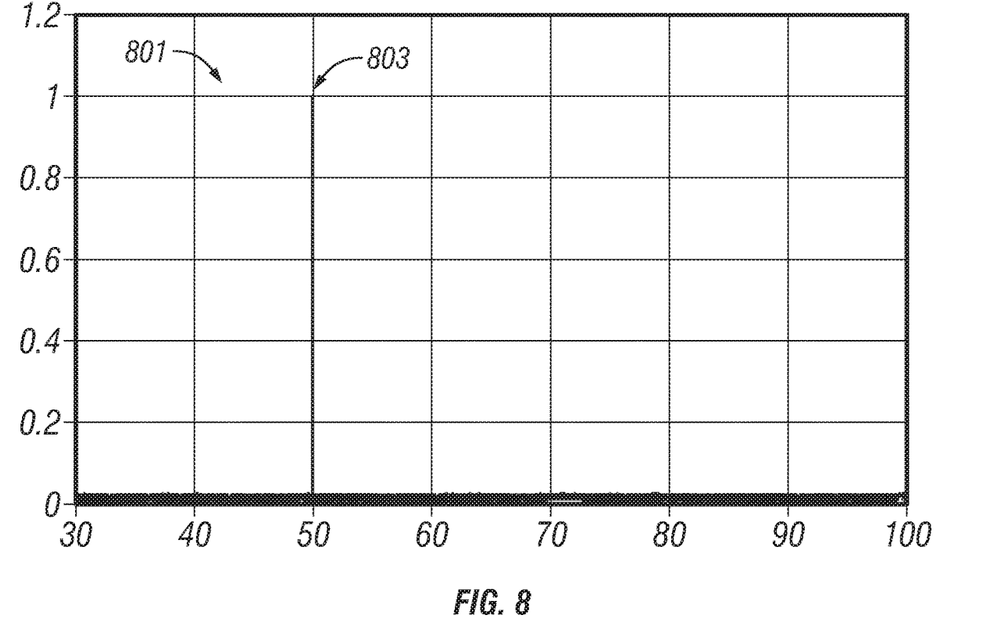
FIG. 8 shows a graph of a frequency response determined from the interrogation signal of FIG. 6 and the return signal of FIG. 7, according to one or more embodiments.

In FIG. 8, a reflection signal 801 (e.g., $r_H(t)$) is shown and represents the inverse Fourier transform of the frequency response $H(\omega)$ of the distributed sensing system determined from the interrogation signal 601 and the return signal 701. From the reflection signal 801, the reflections 703 are reduced to a single reflection 803, which can be identified to exist at a distance of about 50 meters from the origin of the graph. This distance can be correlated to a spatial location along the EM waveguide, such as a borehole depth or surface location. For example, perhaps the reflection 803 is produced from an optical grating coupled along the EM waveguide 44 (FIG. 1A) at the surface bend as the EM waveguide 44 is run into the borehole 16. As another example, the reflection 803 may be produced from an optical coupler joining portions of the EM waveguide 44 (FIG. 1A) together in the borehole 16. The distance associated with the reflection 803 can be used to determine the spatial location associated with the grating or coupler attached to the EM waveguide 44. Thus, the reflection signal 801 can be used to determine the spatial location associated with the reflection 803 produced along the EM waveguide. Additionally, or alternatively, the reflection signal 801 can be used to determine the spatial location associated with the channels of the EM waveguide. It should be appreciated that the reflection signal 801 can be determined by deconvolving the return signal 701 ($r_1(t)$) with the interrogation signal 601 ($i_1(t)$) in the time-domain.

Figure 9:
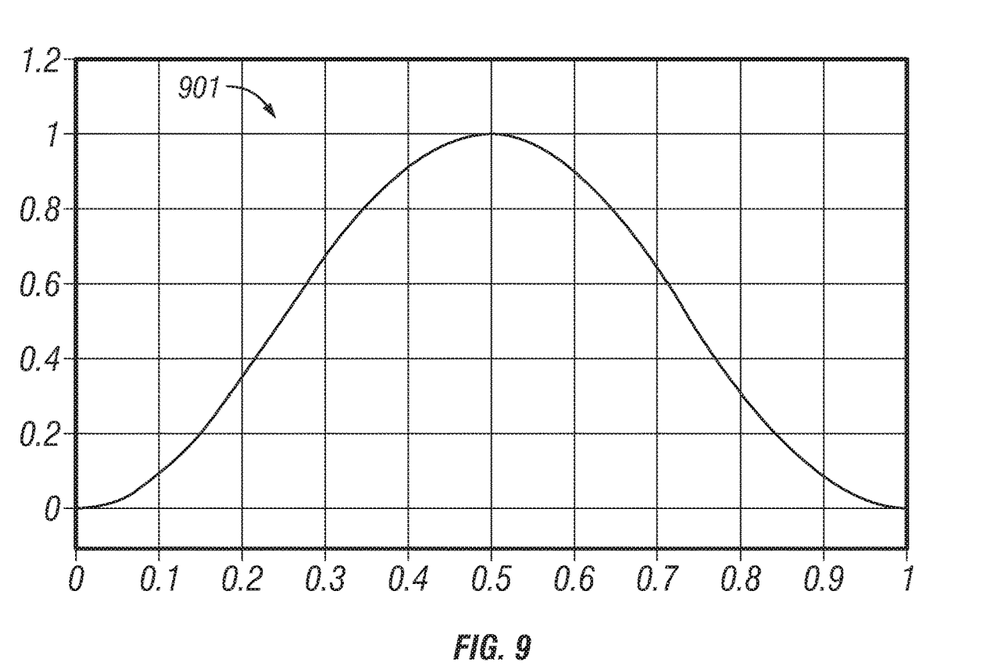
FIG. 9 shows a graph of an interrogation signal of an OTDR system, according to one or more embodiments.

FIG. 9 shows a graph of an interrogation signal 901 (e.g., $i_2(t)$) of an OTDR system, according to one or more embodiments. As shown, the interrogation signal 901 has a pulse width of about 10 nanoseconds and can be used to simulate the results produced by the OTDR system using the reflection signal 801 ($r_H(t)$).

Figure 10:
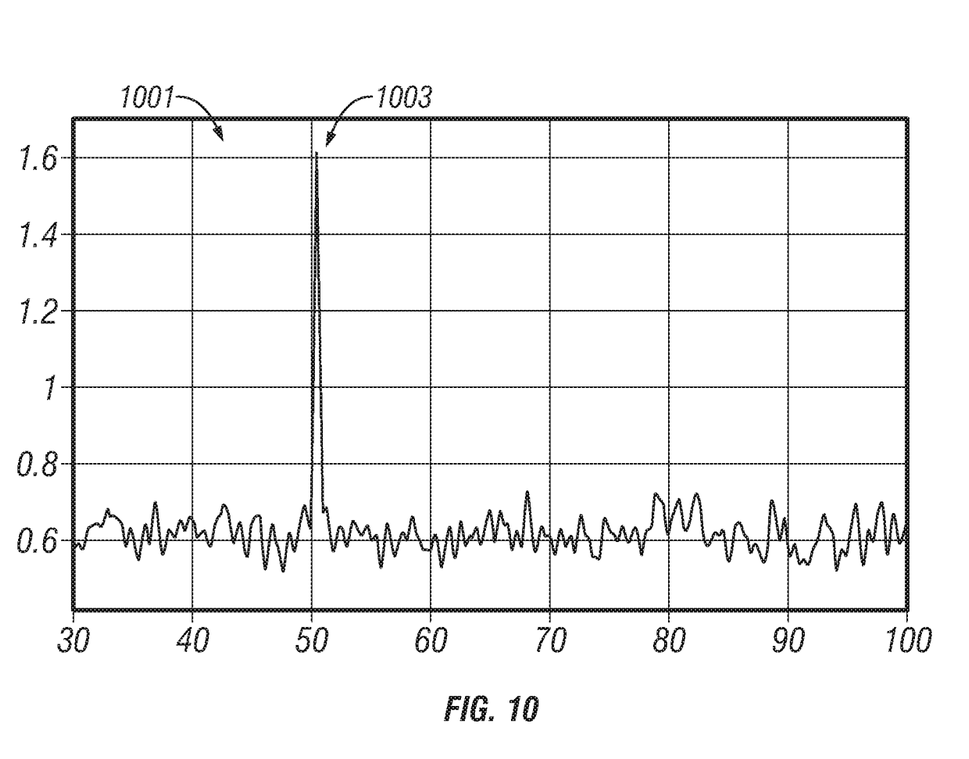
FIG. 10 shows a graph of a reflection signal generated from the frequency response of FIG. 8 and the interrogation signal of FIG. 9, according to one or more embodiments.

FIG. 10 shows a graph of a reflection signal 1001 (e.g., $r_2(t)$) determined from the reflection signal 801 and the interrogation signal 901. The reflection signal 1001 represents the simulated return signal of the OTDR system and confirms that a reflection 1003 can be identified at about 50 meters from the origin of the graph corresponding to the reflections 703 of FIG. 7. It should be appreciated that the reflection signal 1001 can be determined by convolving the reflection signal 801 ($r_H(t)$) with the interrogation pulse 901 ($i_2(t)$) in the time-domain.

In addition to the embodiments described above, many examples of specific combinations are within the scope of the disclosure, some of which are detailed below:

Example 1

A distributed sensing system, comprising:
an electromagnetic (EM) waveguide;
a distributed sensing interrogator coupled to the EM waveguide; and
a processor configured to determine a spatial location associated with a reflection produced along the EM waveguide using a return signal generated from the reflection by the interrogator and an interrogation signal including an interrogation pulse.

Example 2

The distributed sensing system of example 1, wherein the distributed sensing interrogator comprises:
a transmitter coupled to the EM waveguide and configured to generate the interrogation pulse through the EM waveguide; and
a receiver coupled to the EM waveguide and responsive to backscattered EM waves propagating through the EM waveguide.

Example 3

The distributed sensing system of example 1, wherein the processor is further configured to transform both the return signal and the interrogation signal into the frequency domain.

Example 4

The distributed sensing system of example 1, wherein the processor is further configured to deconvolve the return signal with the interrogation signal in the time domain.

Example 5

The distributed sensing system of example 1, wherein the processor is further configured to determine a frequency response with respect to the return signal and the interrogation signal.

Example 6

The distributed sensing system of example 5, wherein the processor is further configured to:
determine a reflection signal in the time-domain using the frequency response; and
determine the spatial location associated with the reflection using the reflection signal.

Example 7

The distributed sensing system of example 5, wherein the processor is further configured to:
determine a product of the frequency response and a pulse in the frequency domain;
transform the product into a reflection signal in the time-domain; and
determine the spatial location associated with the reflection using the reflection signal in the time-domain.

Example 8

The distributed sensing system of example 1, wherein the EM waveguide includes a fiber optic cable and is locatable in a well, and the distributed sensing interrogator is configured to monitor the well.

Example 9

The distributed sensing system of example 1, wherein the spatial location associated with the scattering activity includes a distance from a reference point to a location on the EM waveguide.

Example 10

The distributed sensing system of example 1, wherein the return signal comprises a superposition of a backscattered signal and the backscattered signal delayed by an amount of time, and the interrogation signal comprises a superposition of the interrogation pulse and the interrogation pulse delayed by the amount of time.

Example 11

A method of determining a spatial location associated with a reflection produced along an electromagnetic (EM) waveguide in a distributed sensing system, comprising:
generating a return signal from the reflection with a distributed sensing interrogator coupled to the EM waveguide; and
determining the spatial location associated with the reflection using the return signal and an interrogation signal including an interrogation pulse.

Example 12

The method of example 11, wherein determining the spatial location further comprises transforming both the return signal and the interrogation signal into the frequency domain.

Example 13

The method of example 11, wherein determining the spatial location further comprises determining a frequency response with respect to the return signal and the interrogation signal.

Example 14

The method of example 11, wherein determining the spatial location further comprises deconvolving the return signal with the interrogation signal in the time domain.

Example 15

The method of example 13, wherein determining the spatial location further comprises:
determining a reflection signal in the time-domain using the frequency response; and
determining the spatial location associated with the reflection using the reflection signal.

Example 16

The method of example 13, wherein determining the spatial location further comprises:
determining a product of the frequency response and a pulse in the frequency domain;
transforming the product into a reflection signal in the time-domain; and
determining the spatial location associated with the reflection using the reflection signal.

Example 17

The method of example 11, further comprising:
locating a portion of the EM waveguide in a well, wherein the EM waveguide includes a fiber optic cable; and
monitoring the well using the distributed sensing interrogator.

Example 18

The method of example 11, wherein the spatial location associated with the reflection includes a distance from a reference point to a location on the EM waveguide.

Example 19

A distributed sensing interrogator, comprising:
a transmitter configured to generate an interrogation pulse through an EM waveguide;
a receiver responsive to backscattered EM waves propagating through the EM waveguide; and
a processor configured to determine a spatial location associated with a reflection produced along the EM waveguide using a return signal generated from the reflection by the receiver and an interrogation signal including the interrogation pulse.

Example 20

The distributed sensing interrogator of example 19, wherein the processor is further configured to:
determine a frequency response with respect to the return signal and the interrogation signal;
determine a reflection signal in the time-domain using the frequency response; and
determine the spatial location associated with the reflection using the reflection signal.

Example 21

The distributed sensing interrogator of example 19, wherein the distributed sensing interrogator is configured to couple to the EM waveguide locatable in a well and monitor the well.

This discussion is directed to various embodiments. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:
1. A distributed acoustic sensing system, comprising:
an electromagnetic (EM) waveguide;
a distributed acoustic sensing interrogator coupled to the EM waveguide and operable to generate a first interrogation signal comprising two interrogation pulses at the same frequency delayed by an amount of time and transmitted together through the EM waveguide and receive a return signal comprising a backscattered reflection of the first interrogation signal from a spatial location along the EM waveguide; and a processor configured to determine a property of the EM waveguide at the spatial location as well as the spatial location of the property along the EM waveguide based on the first interrogation signal and the return signal, the spatial location being determined by deconvolving the return signal with the first interrogation signal and then convolving the deconvolved return signal with a second interrogation signal comprising a single interrogation pulse.

2. The distributed acoustic sensing system of claim 1, wherein the distributed acoustic sensing interrogator comprises:
   a transmitter coupled to the EM waveguide and configured to generate the interrogation pulses through the EM waveguide; and
   a receiver coupled to the EM waveguide and responsive to backscattered EM waves propagating through the EM waveguide.

3. The distributed acoustic sensing system of claim 1, wherein the processor is further configured to transform both the return signal and the interrogation signal into the frequency domain.

4. The distributed acoustic sensing system of claim 1, wherein the processor is further configured to deconvolve the return signal with the interrogation signal in the time domain.

5. The distributed acoustic sensing system of claim 1, wherein the processor is further configured to determine a frequency response with respect to the return signal and the interrogation signal.

6. The distributed acoustic sensing system of claim 5, wherein the processor is further configured to:
   determine a reflection signal in the time-domain using the frequency response; and
   determine the spatial location using the reflection signal.

7. The distributed acoustic sensing system of claim 5, wherein the processor is further configured to:
   determine a product of the frequency response and a pulse in the frequency domain;
   transform the product into a reflection signal in the time domain; and
   determine the spatial location using the reflection signal in the time domain.

8. The distributed acoustic sensing system of claim 1, wherein the EM waveguide includes a fiber optic cable and is locatable in a well, and the distributed acoustic sensing interrogator is configured to monitor the well.

9. The distributed acoustic sensing system of claim 1, wherein the spatial location includes a distance from a reference point to a location on the EM waveguide.

10. The distributed acoustic sensing system of claim 1, wherein the return signal comprises a superposition of the backscattered reflection and the backscattered reflection delayed by the amount of time, and the interrogation signal comprises a superposition of the interrogation pulses.

11. A method of determining a spatial location along an electromagnetic (EM) waveguide in a distributed acoustic sensing system, comprising:
   generating a first interrogation signal along the EM waveguide using a distributed acoustic sensing interrogator, the first interrogation signal comprising two interrogation pulses at the same frequency delayed by an amount of time and transmitted together through the EM waveguide;
   generating a return signal from a backscattered reflection of the first interrogation signal from the spatial location with the distributed acoustic sensing interrogator; and
   determining a property of the EM waveguide at the spatial location as well as the spatial location of the property using the first interrogation signal and the return signal, wherein determining the spatial location comprises deconvolving the return signal with the first interrogation signal and then convolving the deconvolved return signal with a second interrogation signal comprising a single interrogation pulse.

12. The method of claim 11, wherein determining the spatial location further comprises transforming both the return signal and the interrogation signal into the frequency domain.

13. The method of claim 11, wherein determining the spatial location further comprises determining a frequency response with respect to the return signal and the interrogation signal.

14. The method of claim 11, wherein determining the spatial location further comprises deconvolving the return signal with the interrogation signal in the time domain.

15. The method of claim 13, wherein determining the spatial location further comprises:
   determining a reflection signal in the time-domain using the frequency response; and
   determining the spatial location using the reflection signal.

16. The method of claim 13, wherein determining the spatial location further comprises:
   determining a product of the frequency response and a pulse in the frequency domain;
   transforming the product into a reflection signal in the time domain; and
   determining the spatial location using the reflection signal in the time domain.

17. The method of claim 11, further comprising:
   locating a portion of the EM waveguide in a well, wherein the EM waveguide includes a fiber optic cable; and
   monitoring the well using the distributed acoustic sensing interrogator.

18. The method of claim 11, wherein the spatial location includes a distance from a reference point to a location on the EM waveguide.

19. A distributed acoustic sensing interrogator, comprising:
   a transmitter configured to generate a first interrogation signal comprising two interrogation pulses at the same frequency delayed by an amount of time for co-transmission through an EM waveguide;
   a receiver responsive to backscattered EM waves propagating through the EM waveguide and configured to receive a return signal comprising a backscattered reflection of the first interrogation signal from a spatial location along the EM waveguide; and
   a processor configured to determine a property of the EM waveguide at the spatial location as well as the spatial location of the property along the EM waveguide using the first interrogation signal and the return signal, the spatial location being determined by deconvolving the return signal with the first interrogation signal and then convolving the deconvolved return signal with a second interrogation signal comprising a single interrogation pulse.

20. The distributed acoustic sensing interrogator of claim 19, wherein the processor is further configured to:
    determine a frequency response with respect to the return signal and the interrogation signal;
    determine a reflection signal in the time-domain using the frequency response; and
    determine the spatial location using the reflection signal.

21. The distributed acoustic sensing interrogator of claim 19, wherein the distributed acoustic sensing interrogator is configured to couple to the EM waveguide locatable in a well and monitor the well.

\* \* \* \* \*